United States Patent
Bell et al.

(10) Patent No.: US 9,440,546 B2
(45) Date of Patent: Sep. 13, 2016

(54) ELECTRIC VEHICLE CHARGING SYSTEM

(71) Applicant: FORD GLOBAL TECHNOLOGIES, LLC, Dearborn, MI (US)

(72) Inventors: Donna L. Bell, Cascade Ct., MI (US); David McCreadie, Ann Arbor, MI (US); Michael Robert Tinskey, Commerce, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

(21) Appl. No.: 14/284,711

(22) Filed: May 22, 2014

(65) Prior Publication Data

US 2015/0175024 A1 Jun. 25, 2015

Related U.S. Application Data

(60) Provisional application No. 61/919,296, filed on Dec. 20, 2013.

(51) Int. Cl.
 *H01M 10/44* (2006.01)
 *B60L 11/18* (2006.01)
 *H02J 7/35* (2006.01)

(52) U.S. Cl.
 CPC .............. *B60L 11/1824* (2013.01); *H02J 7/35* (2013.01)

(58) Field of Classification Search
 CPC .......... Y02E 60/12; H02J 7/35; H02J 7/355; H01M 10/465; H01M 16/006
 USPC ........................................................ 320/101
 See application file for complete search history.

(56) References Cited

U.S. PATENT DOCUMENTS

| | | | | |
|---|---|---|---|---|
| 4,498,460 A | * | 2/1985 | Mori | F21S 11/00 126/605 |
| 6,922,622 B2 | * | 7/2005 | Dulin | B06B 1/0215 180/272 |
| 8,119,963 B2 | * | 2/2012 | Scanlon | F24J 2/38 136/244 |
| 2008/0053513 A1 | * | 3/2008 | Palmer | F03G 6/065 136/246 |
| 2008/0143292 A1 | * | 6/2008 | Ward | B60L 8/003 320/101 |
| 2010/0006140 A1 | * | 1/2010 | Parker | F24J 2/08 136/246 |
| 2012/0091959 A1 | * | 4/2012 | Martin | B60L 11/1829 320/109 |
| 2012/0317900 A1 | * | 12/2012 | Den Boer | C03B 18/14 52/173.3 |

FOREIGN PATENT DOCUMENTS

WO 2011140557 A1 11/2011

OTHER PUBLICATIONS

235 Watt—Pole mounted solar power unit with sun Tracking, http://www.atrcorp.com/documents/solar/ATR-SPT-1010-235GT.pdf, 2 pages.
Volvo's New Diesel Hybrid Gets a Sleek, Foldable Solar Charger, http://www.nesea.org/renewable-energy/volvos-new-diesel-hybrid-gets-a-sleek-foldable-solar-charger/, 2 pages, printed Mar. 12, 2013.

* cited by examiner

*Primary Examiner* — Richard Isla Rodas
*Assistant Examiner* — Mohammed J Sharief
(74) *Attorney, Agent, or Firm* — David Kelley; Brooks Kushman P.C.

(57) ABSTRACT

A vehicle and a vehicle battery charging system are disclosed. The vehicle charging system includes a parking structure having solar collector. The solar collector is configured to collect and concentrate solar energy. The concentrated solar energy is then transferred to a solar panel located on the vehicle in order to charge a battery of the vehicle.

17 Claims, 8 Drawing Sheets

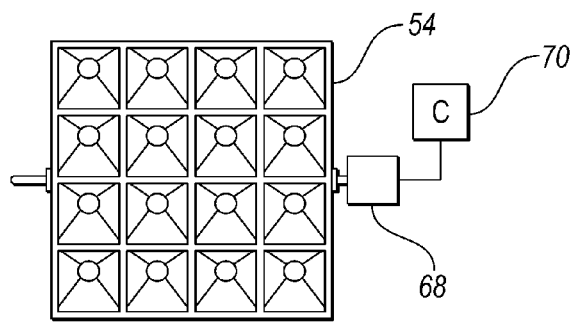
FIG. 6
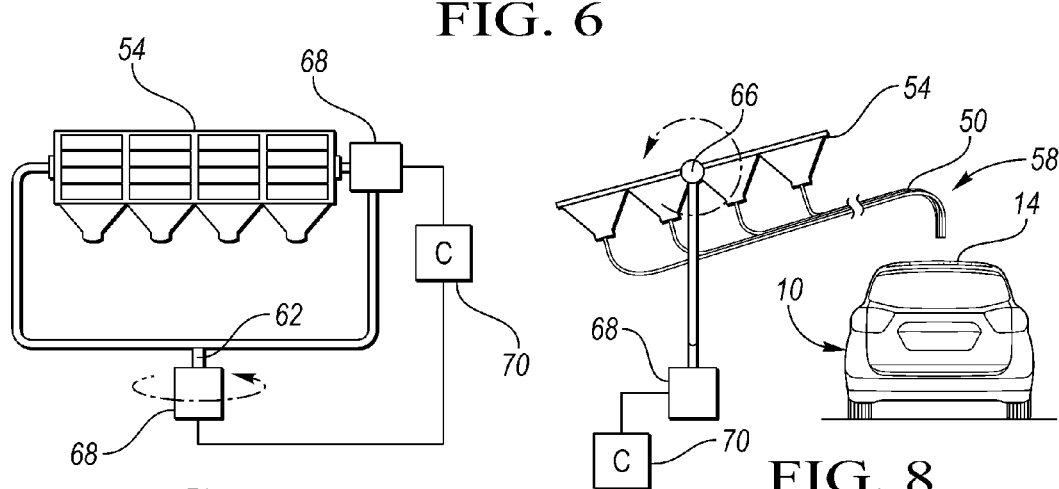
FIG. 7
FIG. 8
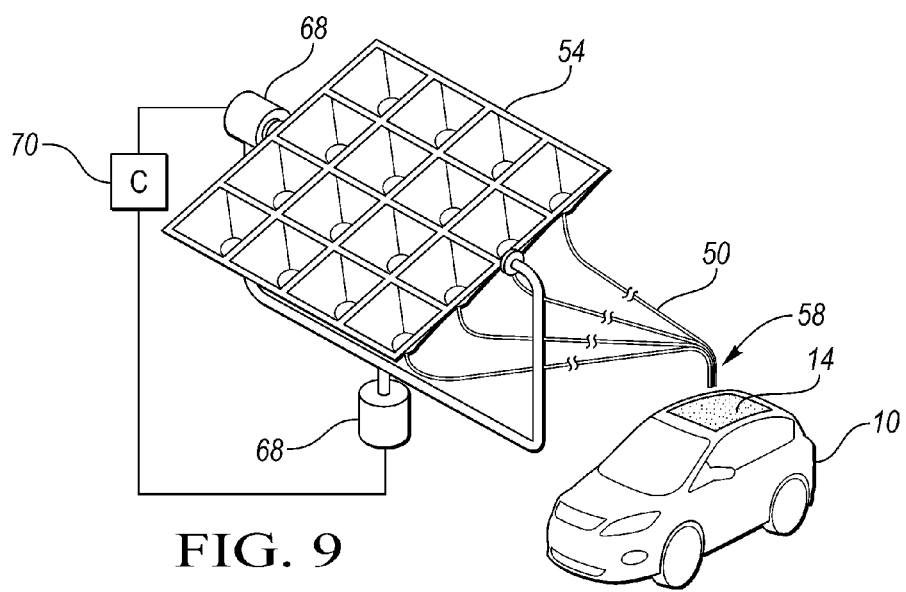
FIG. 9

ELECTRIC VEHICLE CHARGING SYSTEM

CROSS-REFERENCE TO RELATED APPLICATION

This application claims the benefit of U.S. provisional application No. 61/919,296 filed on Dec. 20, 2013, the disclosure of which is hereby incorporated in its entirety by reference herein.

TECHNICAL FIELD

This disclosure relates to charging electric and hybrid vehicle batteries.

BACKGROUND

Generally, electric vehicles differ from conventional motor vehicles because electric vehicles are selectively driven using one or more battery-powered electric machines. Conventional motor vehicles, by contrast, rely exclusively on an internal combustion engine to drive the vehicle. Electric vehicles may use electric machines instead of, or in addition to, the internal combustion engine.

Example electric vehicles include hybrid electric vehicles (HEVs), plug-in hybrid electric vehicles (PHEVs), fuel cell vehicles, and battery electric vehicles (BEVs). A powertrain of an electric vehicle is typically equipped with a battery that stores electrical power for powering the electric machine. The battery may be recharged by regenerative braking, an internal combustion engine, electric grid ("plugging in"), or other means of energy harvesting, such as photovoltaics.

Charging stations typically are connected to an electric grid infrastructure to charge a battery of an electric vehicle prior to use. A barrier to adopting electric vehicles is the lack of supporting infrastructure for charging and refueling. Creating new charging stations can be costly and difficult to achieve.

SUMMARY

In one aspect of the disclosure, a vehicle battery charging system is disclosed. The vehicle charging system includes a parking structure having a solar collector. The solar collector is configured to collect and concentrate solar energy. The concentrated solar energy is then directed to a solar panel located on a vehicle parked within the parking structure, in order to charge a battery of the vehicle. The solar collector may include a lens or an array of lenses, such as Fresnel lenses, that are utilized to collect and concentrate the solar energy. Fiber optic cables may also be utilized to transfer the concentrated solar energy from the solar collector to the solar panel. Either the solar collector or the position of the vehicle may be adjusted in response to the movement of the Sun across the sky, and thus the movement of the focalized area of concentrated solar energy.

In another aspect of the disclosure, a method of charging a vehicle battery is disclosed. The method includes collecting and concentrating solar energy with a solar collector located on a parking structure and then directing the concentrated solar energy to a solar panel located on a vehicle, parked within the parking structure, in order to charge a vehicle battery. The solar collector may include a lens or an array of lenses, such as Fresnel lenses, that are utilized to collect and concentrate the solar energy. Fiber optic cables may also be utilized to transfer the concentrated solar energy from the solar collector to the solar panel. Either the solar collector or the position of the vehicle may be adjusted in response to the movement of the Sun across the sky, and thus the movement of the focalized area of concentrated solar energy.

In yet another aspect of the disclosure, a vehicle configured to interact with a solar collector on a parking structure is disclosed. The solar collector is configured to collect and concentrate solar energy. A solar panel located on the vehicle is configured to receive the concentrated solar energy from the solar collector in order to charge a battery of the vehicle. The vehicle may also include a controller that is configured to move the vehicle in response to a movement of the concentrated solar energy.

BRIEF DESCRIPTION OF THE DRAWINGS

FIG. 6 shows a top view of an example fiber optic solar collector array for charging the vehicle of FIG. 1;

FIG. 7 shows an front view of the fiber optic solar collector array of FIG. 6;

FIG. 8 shows a side view of the fiber optic solar collector array of FIG. 6 and the vehicle of FIG. 1;

FIG. 9 shows a perspective view of the fiber optic solar collector array of FIG. 6 with the vehicle of FIG. 1.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
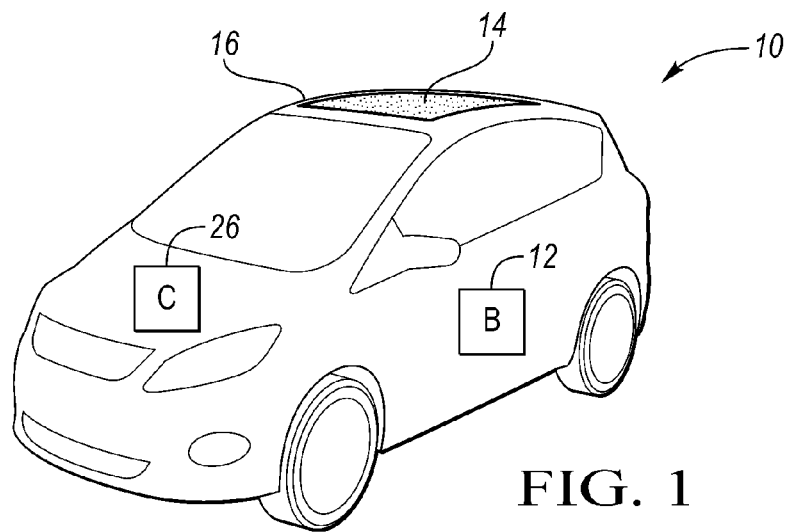
FIG. 1 shows a perspective view of an example electric vehicle.
Figure 2:
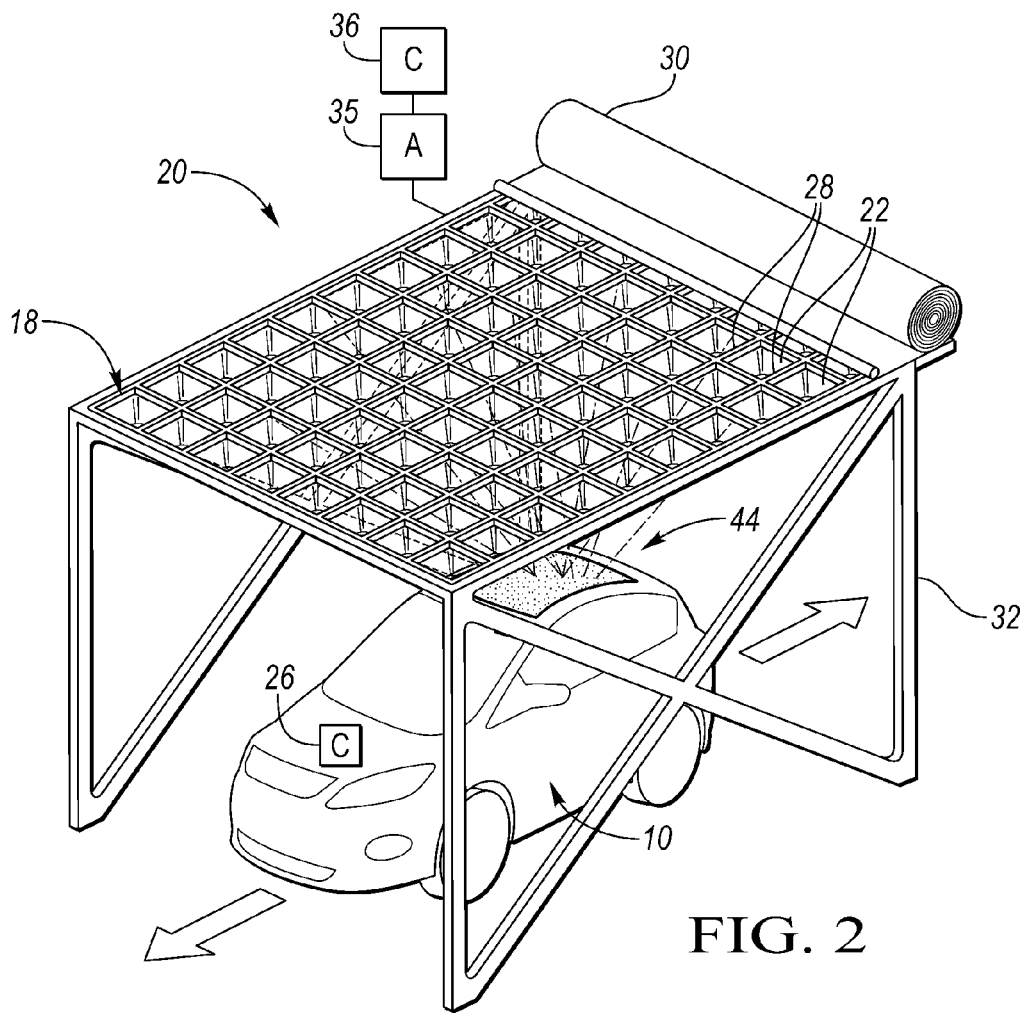
FIG. 2 shows a perspective view of a solar collector and the electric vehicle of FIG. 1.

Referring to FIGS. 1 and 2, an example electric vehicle 10 is selectively driven using one or more battery-powered electric machines. The electric vehicle 10 may use electric machines instead of, or in addition to, the internal combustion engine.

The powertrain of the electric vehicle 10 is typically equipped with a battery 12 that stores electrical power for powering the electric machine of the electric vehicle 10. The battery 12 may be recharged by regenerative braking, an internal combustion engine, solar energy, or some combination of these.

Solar energy for charging the battery 12 is collected through at least one solar panel 14. The solar panel 14 is mounted to a top, or roof 16, of the electric vehicle 10. The solar panel 14 collects solar energy to recharge the battery 12 of the electric vehicle 10 during daylight hours. The solar panel 14 collects solar energy when the electric vehicle 10 is driving and when the electric vehicle 10 is parked.

When the vehicle 10 is parked, a solar collector 18, which is also a solar concentrator, collects and concentrates solar power onto the solar panel 14 in order to expedite charging of the battery 12. The solar collector 18 has a significantly larger surface area larger than the surface area of the solar panel 14. The solar collector 18 may be part of a parking structure 20, which may have a canopy. The battery 12 of the vehicle 10 shown may hold from 7 to 8 kWH of power and can be fully recharged in one day utilizing the solar collector 18 exposed to an average solar irradiation for one day. However, power capacity the vehicle battery may different depending on the type, size, and design of the battery; and may be different depending on the type of vehicle.

The solar collector 18 may include at least one Fresnel lens. The embodiment depicted includes an array of Fresnel lens 22 arranged in a 10×8 grid. The solar collector 18, however, should not be construed as limited to an array of Fresnel lenses arranged in a 10×8 grid and but should be construed to included other configurations. Alternatively, the solar collector 18 may utilize other types of lenses, prisms, minors, to bend and redirect the sunlight as opposed to using Fresnel lenses. Supports 28 may run between adjacent Fresnel lenses 22 to hold the positions of the Fresnel lenses 22. The Fresnel lenses 22 may be made from acrylic. A Fresnel lens 22, at a three meter focal length, can yield 90 percent acrylic transmissibility.

The dimensions of individual Fresnel lenses 22 shown may be 0.5 meters by 0.5 meters square, having a thickness of 0.005 meters. The total surface area of the Fresnel lenses in the shown embodiment that is arranged in a 10×8 grid would have a surface area of approximately 20 square meters, this surface area correlating with the surface area that collects the solar energy. However, other embodiments may have a surface area that collects the solar energy ranging anywhere from 3 to 75 square meters. The surface area for collecting solar energy may also have a ratio compared to the surface area of the solar panel 14 on the vehicle 10 that ranges anywhere from 50:1 to 2:1.

When parking of the vehicle 10 is desired, the vehicle 10 is driven beneath the solar collector 18 of the parking structure 20. Legs 32 may be used to elevate the Fresnel lenses 22 and supports 28 so that the vehicle 10 can be moved beneath the solar collector 18.

Figure 3A:
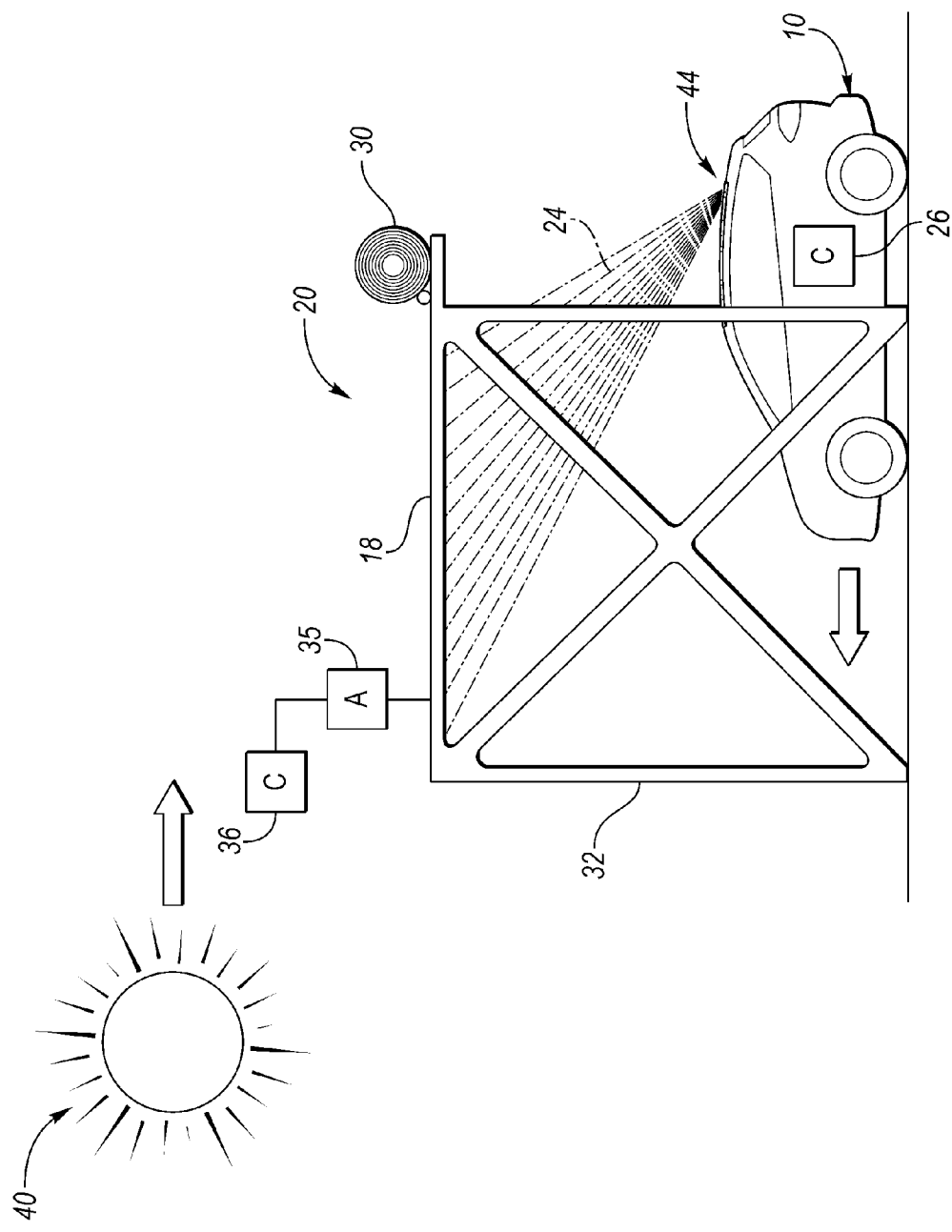
FIG. 3A shows a side view of FIG. 2 during a charge prior to solar noon.
Figure 3B:
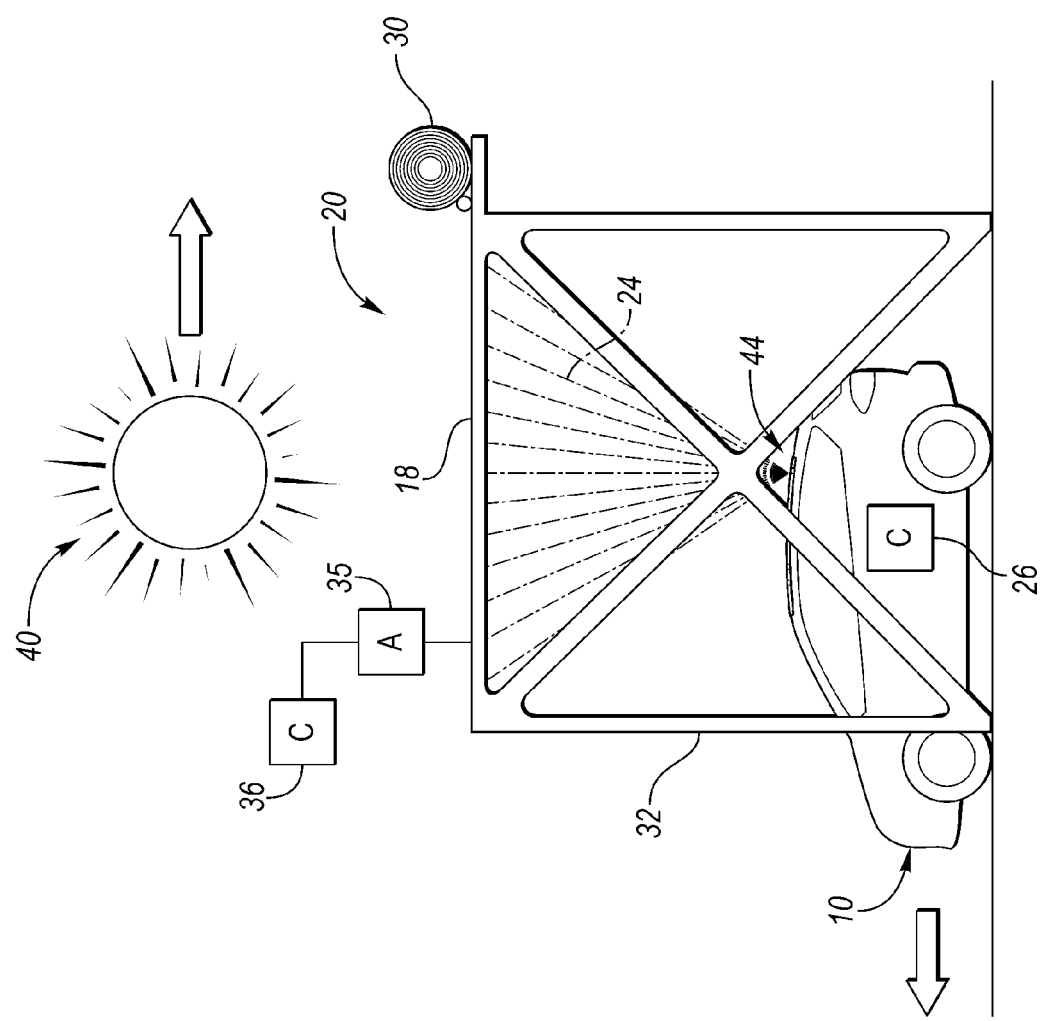
FIG. 3B shows a side view of FIG. 2 during a charge at solar noon.
Figure 3C:
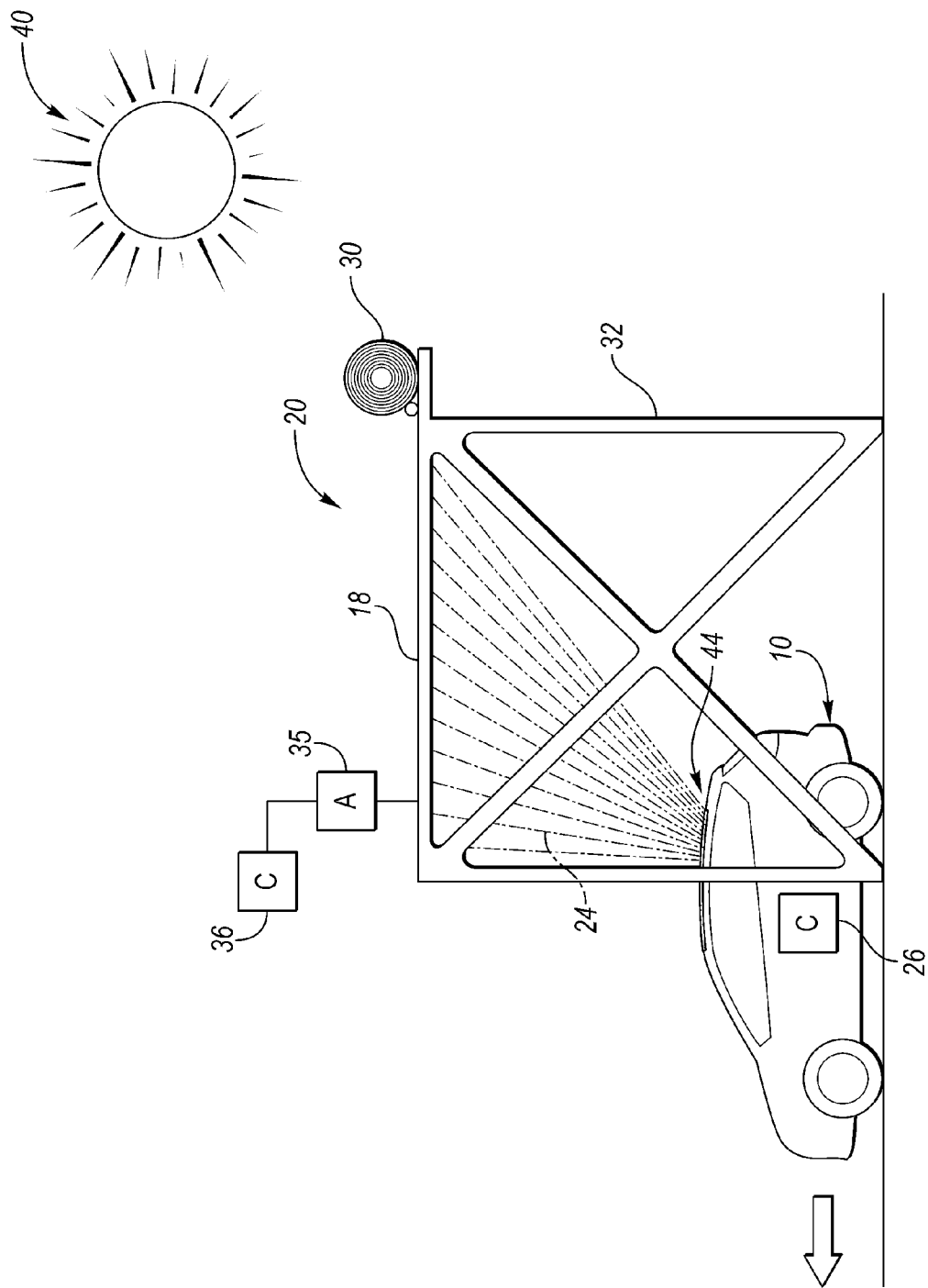
FIG. 3C shows a side view of FIG. 2 during a charge after solar noon.

Referring now to FIGS. 3A-3C with continuing reference to FIG. 2, the solar collector 18 focuses solar rays 24 from the Sun 40 in order to concentrate the solar energy, which may converge at a focal point 44. The solar collector 18 remains stationary relative to the vehicle 10 when the vehicle 10 is parked. As the Sun 40 passes over the solar collector 18, the position of the concentrated solar energy and the focal point 44 changes. The vehicle 10 is capable of adjusting its position relative to the solar collector 18 to ensure that the concentrated solar energy near the focal point 44 falls on the solar panel 14 as the position of the Sun 40 changes.

Solar noon corresponds to the moment when the Sun 40 transits the celestial meridian, which is generally the time when the Sun 40 is highest above the horizon for a given day.

In this example, well before solar noon (FIG. 3A), the concentrated solar energy and focal point 44 is positioned aft of the solar collector 18. At solar noon (FIG. 3B), the Sun 40 is directly above the solar collector 18 and the concentrated solar energy and focal point 44 is directly beneath the solar collector 18. After solar noon (FIG. 3C), the Sun 40 moves to pass over the solar collector 18 and the concentrated solar energy and focal point 44 gradually moves forward of the solar collector 18.

The vehicle 10 adjusts its position in response to the movement of concentrated solar energy and the focal point 44, such that the concentrated solar energy and focal point 44 is always directed onto the solar panel 14. This maximizes the effectiveness of the charging. If the vehicle 10 were to remain stationary relative to the solar collector 18 as the Sun 40 moves relative to the solar collector 18, the concentrated solar energy and focal point 44 would move away from the solar panel 14. Adjusting the position of the electric vehicle 10 thus enhances the effectiveness of charging the vehicle 10. The sunlight stays concentrated on the solar panel 14 of the vehicle 10 throughout the day as the Sun 40 moves across the sky.

The vehicle 10 may be adjusted utilizing autonomous driving capability. That is, the vehicle 10 can move from the position of FIG. 3A where the vehicle 10 has a portion extending aftward of the solar collector 18 to the position of FIG. 3C where the vehicle has a portion extending forward from the solar collector 18 without direct driver interaction. The vehicle 10 may also be controlled by remote control.

Vehicle telematics, GPS positions, Bluetooth, cloud computing, motor control strategies, autonomous steering systems, and vehicle sensors, may be utilized to detect position of the vehicle 10 relative to the solar collector 18 and specifically the focal point 44 associated with the solar collector 18. The focal point 44 associated with the solar collector 18 may be determined by the position of the Sun 40, which is determined by the time of day and is adjusted for seasonal differences in the position of the Sun 40. The latitude and longitude (GPS coordinates) also determine the position of the Sun 40. The adjustment for the seasonal differences in the position of the Sun 40 may be calculated and implemented in increments at predetermined intervals (i.e. daily, weekly, monthly, seasonally etc.). This information may be used as an input to a vehicle controller 26 which directs the repositioning of the vehicle 10 to ensure the solar panel 14 stays within the focal point 44 and the concentrated solar energy.

Figure 4:
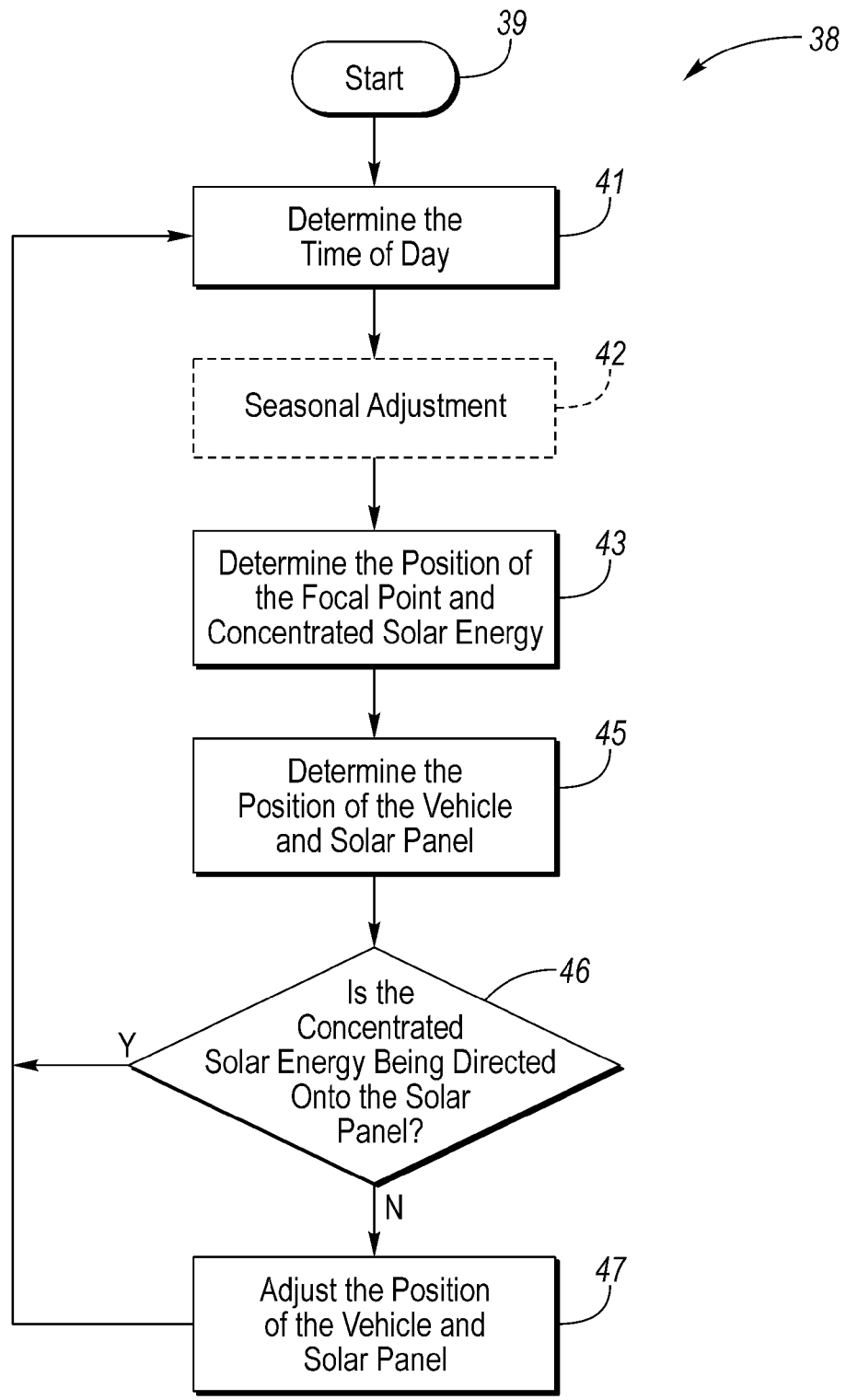
FIG. 4 is a flowchart illustrating an algorithm for controlling the position of the vehicle relative to the concentrated solar energy.

Referring to FIG. 4, an algorithm 38 for controlling the position of the vehicle 10 relative to the concentrated solar energy is illustrated. The algorithm 38 may be implemented using software code contained within the vehicle controller 26. In other embodiments, the algorithm may be implemented in other controllers, or distributed among multiple controllers.

At step 39 the vehicle 10 is parked under the parking structure 20 and the algorithm 38 begins to operate. Next, the time of day is determined at step 41 which is then adjusted at step 42 for seasonal differences in the position of the Sun 40. Step 42 may be calculated and implemented in increments at predetermined intervals (i.e., daily, weekly, monthly, seasonally, etc.). Therefore, step 42 may be skipped between intervals of seasonal adjustment. The position of the concentrated solar energy and focal point 44 is then determined at step 43. At step 45, the position of the vehicle 10 and/or solar panel 14 are determined. At step 46, it is determined whether the concentrated solar energy is being directed onto the solar panel 14. If the concentrated solar energy is not being directed onto the solar panel 14, the position of the vehicle 10 is adjusted so that the concentrated solar energy is directed onto the solar panel 14 at step 47 and the algorithm 38 then returns to step 41. If the concentrated solar energy is being directed onto the solar panel 14, the vehicle 10 is not adjusted and the algorithm 38 returns to step 41. The algorithm 38 may be programmed to continually repeat or operate at predetermined time increments (i.e. every 5 minutes, every 30 minutes, every 60 minutes, etc.) after returning to step 41. The algorithm 38 may also be programmed to operate only during time periods of optimal direct sunlight, or only when the vehicle 10 is parked under the parking structure 20.

Referring again to FIG. 2, the solar collector 18 may also include a shading device 30. The shading device 30 may be a roller shade, shutters, blinds, or some other type of device that is placed over the solar collector 18, which prevents sunlight from entering the Fresnel lenses 22 which in turn prevents the solar collector 18 from concentrating solar energy. In another example, the shading device may be a system that simply adjusts the position the solar collector 18, so that it is positioned in such a way relative to the Sun 40 so that solar energy may not be collected. The shading device 30 is shown as a roller shade in FIG. 2 for illustrative purposes, but should not be construed as limited to a roller shade only.

The shading device 30 may be utilized when the vehicle 10 is not present in the parking structure 20 when there is no need to concentrate solar energy. The shading device 30 may also be utilized as a safety precaution when the vehicle begins to reach temperatures that may be damaging to the vehicle 10 or vehicle components, or when the concentrated solar energy reaches levels that may be dangerous to objects or people in the vicinity of the solar collector 18. Proximity sensors may be used to determine if a vehicle 10 is present, and temperature sensors, capable of sending an overheating warning signal, may be used to determine if the temperature of the vehicle 10 or the temperature in the parking structure 20 have reached levels that may be damaging to the vehicle 10 and/or dangerous to other objects or people within the vicinity of the solar collector 18. In the alternative, the position of the vehicle 10 may be adjusted as a safety precaution when temperatures are reached that may be damaging to the vehicle 10. The shading device 30 may be controlled using software code contained within a controller that is integral to either the parking structure 20 or the vehicle 10. In other embodiments, the algorithm for controlling the shading device may be implemented in other controllers, or distributed among multiple controllers.

Although this example indicates that the vehicle 10 adjusts relative to the solar collector 18, other examples may instead include adjustments of the solar collector 18 to reposition the focal point 44 and concentrated solar energy, or movement of the solar panel 14 relative to both the vehicle 10 and the solar collector 18. For example, the Fresnel lenses 22 may be attached to supports that include a pivoting mechanism that allow each individual Fresnel lens 22 or an the entire array of Fresnel lenses 22 to be adjusted in either one or two directions in order to reposition the focal point 44 and concentrated solar energy. The pivoting mechanism may be linked to actuators 35, such as motors or linear motion devices, such as pneumatic cylinders. The actuators 35 may be powered by any conventional source such as batteries, solar panels, the power grid, etc. The actuators 35 may be attached to a controller 36 which directs the actuators 35 to adjust the position of the Fresnel lenses 22 in order to adjust the position of the concentrated solar energy and focal point 44 relative to the solar panel 14. An example of a pivoting (or swivel) mechanism having actuators is described below and is illustrated in FIGS. 6-9. The controller 36 may be in communication with the vehicle 10 by any type of wireless communication system such as Bluetooth, cloud computing, GPS, etc., to determine the location of the vehicle 10 and solar panel 14 relative to the focal point 44 and concentrated solar energy. Time of day adjusted for seasonal differences in the position of the Sun 40, would be used as an input to the controller to determine how the Fresnel lenses 22 can be adjusted to focus the concentrated solar energy onto the solar panel 14. The controller 36 may also be used to control the shading device 30.

Figure 5:
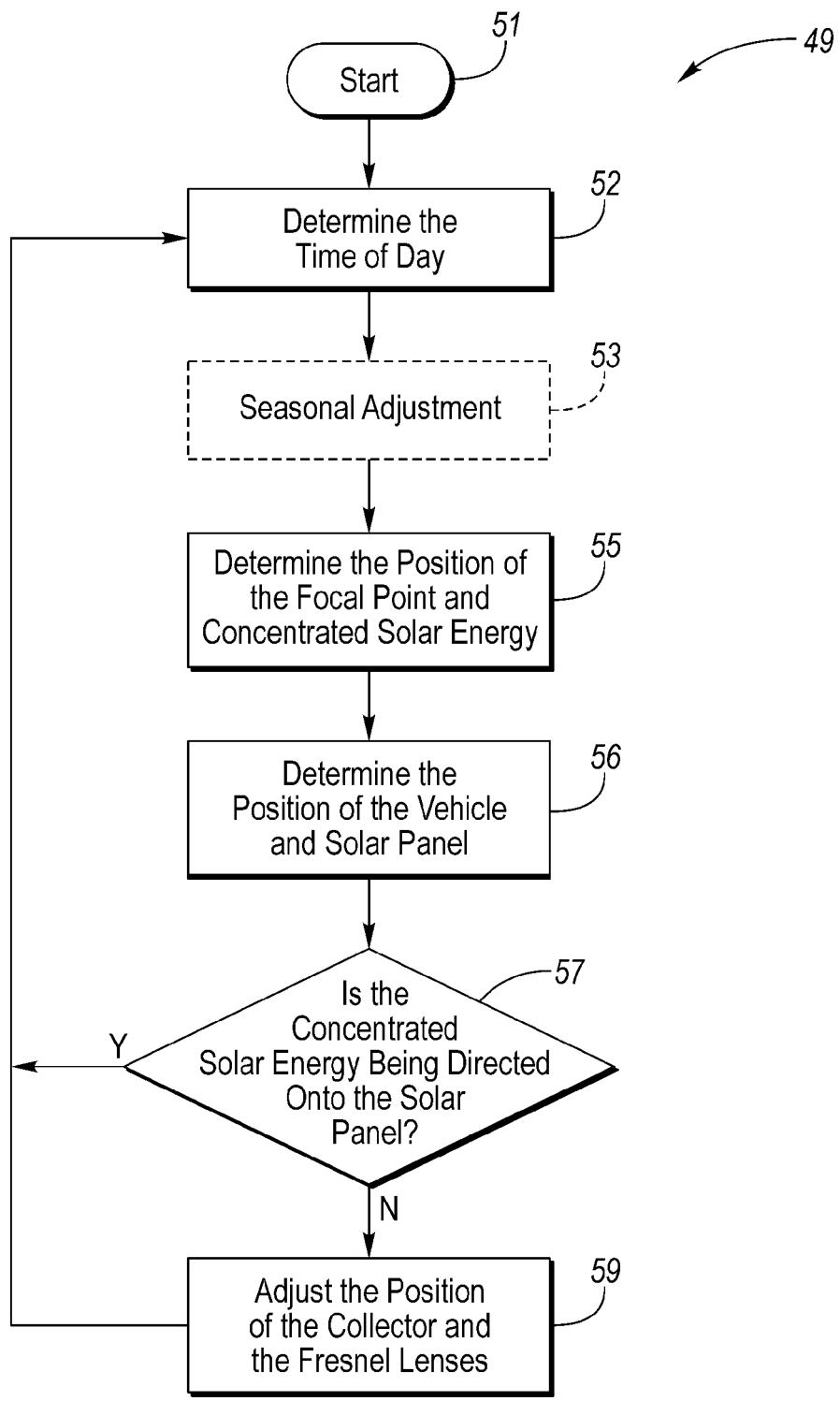
FIG. 5 is a flow chart illustrating an algorithm for controlling the position of the solar collector in order to adjust the position of the concentrated solar energy relative to the vehicle's solar panel.

Referring to FIG. 5, an algorithm 49 for controlling the position of the solar collector 18 in order to adjust the position of the concentrated solar energy relative to the vehicle's solar panel 14 is illustrated. The algorithm 49 may be implemented using software code contained within the controller 36. In other embodiments, the algorithm may be implemented in other controllers, or distributed among multiple controllers.

At step 51 the vehicle 10 is parked under the parking structure 20 and the algorithm 49 begins to operate. Next, the time of day is determined at step 52 which is then adjusted at step 53 for seasonal differences in the position of the Sun 40. Step 53 may be calculated and implemented in increments at predetermined intervals (i.e. daily, weekly, monthly, seasonally, etc.). Therefore, step 53 may be skipped between intervals of seasonal adjustment. The position of the concentrated solar energy and focal point 44 is then determined at step 55. At step 56, the position of the vehicle 10 and/or solar panel 14 are determined. At step 57, it is determined whether the concentrated solar energy is being directed onto the solar panel 14. If the concentrated solar energy is not being directed onto the solar panel 14, the position of the solar collector 18 is adjusted so that the concentrated solar energy is directed onto the solar panel 14 at step 59 and the algorithm 49 then returns to step 52. If the concentrated solar energy is being directed onto the solar panel 14, the solar collector 18 is not adjusted and the algorithm 49 returns to step 52. The algorithm 49 may be programmed to continually repeat or operate at predetermined time increments (i.e. every 5 minutes, every 30 minutes, every 60 minutes, etc.) after returning to step 52. The algorithm 49 may also be programmed to operate only during time periods of optimal direct sunlight, or only when the vehicle 10 is parked under the parking structure 20.

The control of the position of the vehicle 10 relative to the focal point 44 and concentrated solar energy or the control of the position of the focal point 44 and the concentrated solar energy relative to the vehicle 10, may also take into account the orientation of the vehicle (i.e. whether it was pulled into the parking structure 20 forwards or backwards) and the varying position of the solar panel 14 on different vehicle model types.

Referring now to FIGS. 6 through 9, in another example, fiber optic cables 50 extend from a solar collector array 54 to a diffuser end 58. The solar collector array 54 may, or may not, include Fresnel lenses. The fiber optic cables 50 transmit solar energy used to charge the solar panel 14 of the vehicle 10. The diffuser end 58 interfaces directly with the solar panel 14. The fiber optic cables 50 provide some flexibility with the placement of the solar collector array 54. The solar collector array 54 could be located over the vehicle 10 or offsite, for example.

The solar collector array 54 associated with the fiber optic cables 50 may include a base swivel feature 62 and a unit swivel feature 66. Such features 62 and 66 enable the solar collector array 54 to be adjusted to enhance solar tracking. The swivel feature 62 and unit swivel feature 66 may be linked to actuators 68, such as motors or linear motion devices (i.e., pneumatic cylinders). The actuators 68 may be powered by any conventional source such as batteries, solar panels, the power grid, etc. The actuators 68 may be attached to a controller 70 which directs the actuators to adjust the position of the solar collector array 54 relative to the Sun 40. Time of day adjusted for seasonal differences in the position of the Sun 40, would be used as an input to the controller 70 so that the solar collector array 54 may be adjusted to maximize the amount of direct sunlight that is collected. The controller 70 may also be used to control a shading device.

Figure 10:
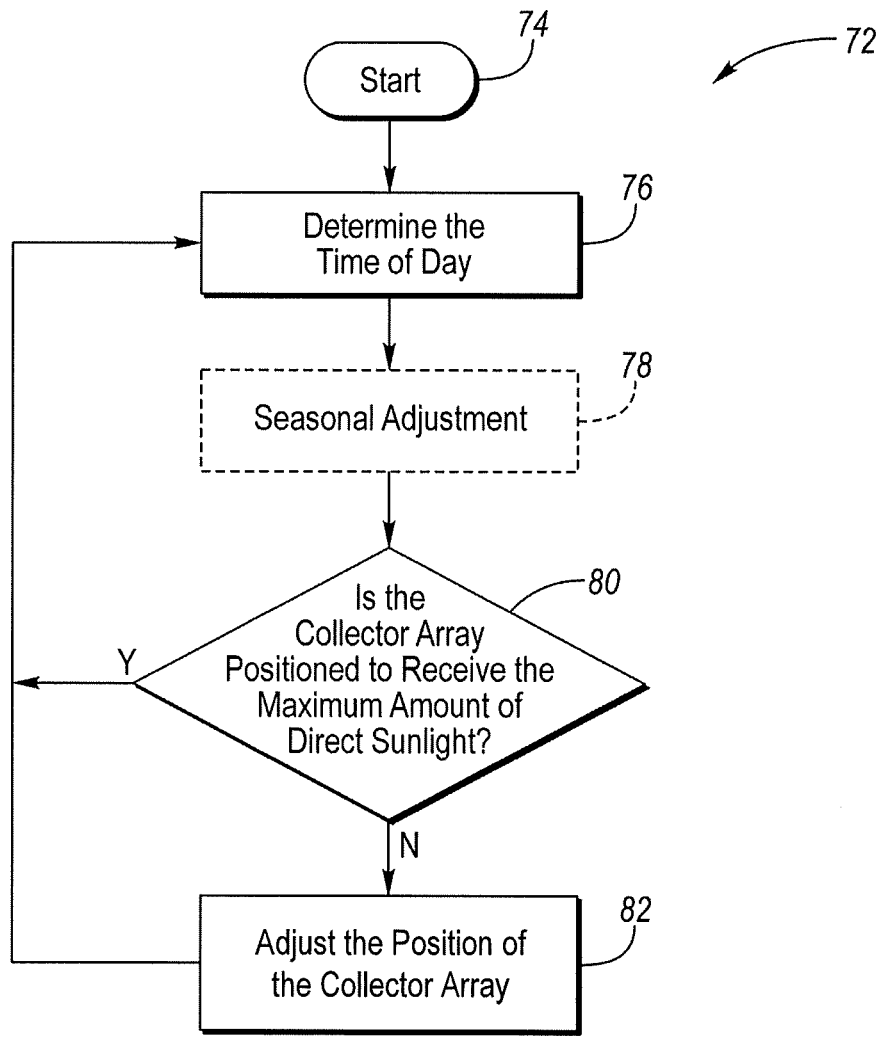
FIG. 10 is a flow chart illustrating an algorithm for controlling the position of the fiber optic solar collector array relative to receiving direct sunlight.

Referring to FIG. 10, an algorithm 72 for controlling the position of the fiber optic solar collector array 54 relative to receiving direct sunlight is illustrated. The algorithm 72 may be implemented using software code contained within the controller 70. In other embodiments, the algorithm may be implemented in other controllers, or distributed among multiple controllers.

At step 74 the vehicle 10 is parked under the parking structure 20 with the fiber optic cables 50 positioned over the solar panel 14, and the algorithm 72 begins to operate. Next, the time of day is determined at step 76 which is then adjusted at step 78 for seasonal differences in the position of the Sun 40. Step 78 may be calculated and implemented in increments at predetermined intervals (i.e. daily, weekly, monthly, seasonally, etc.). Therefore, step 78 may be skipped between intervals of seasonal adjustment. At step 80, it is determined whether the solar collector array 54 has been positioned to receive the maximum amount of direct sunlight. If the solar collector array 54 has not been positioned to receive the maximum amount of direct sunlight, the position of the solar collector array 54 is adjusted at step 82 so that the solar collector array 54 receives the maximum amount of direct sunlight and the algorithm 72 then returns to step 76. If the solar collector array 54 has been positioned to receive the maximum amount of direct sunlight, the solar collector array 54 is not adjusted and the algorithm 72 returns to step 76. The algorithm 72 may be programmed to continually repeat or operate at predetermined time increments (i.e. every 5 minutes, every 30 minutes, every 60 minutes, etc.) after returning to step 76. The algorithm 72 may also be programmed to operate only during time periods of optimal direct sunlight, or only when the vehicle 10 is parked under the parking structure 20.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle battery charging system comprising:
   a parking structure having a solar collector configured to,
      collect and concentrate solar energy, and
      direct the concentrated solar energy to a solar panel that is rigidly affixed to a vehicle parked within the parking structure in order to charge a vehicle battery; and
   a controller programmed to, in response to a change in focus direction of the concentrated solar energy, adjust the position of the vehicle based on the time of day to compensate for movement of the Sun such that the concentrated solar energy remains directed to the solar panel.

2. The vehicle battery charging system of claim 1, wherein the solar collector includes at least one Fresnel lens configured to concentrate and direct the solar energy to the solar panel located on the vehicle.

3. The vehicle battery charging system of claim 1, wherein the controller is programmed to adjust the position of the vehicle in response to seasonal differences in the position of the Sun.

4. The vehicle battery charging system of claim 1, wherein the vehicle battery charging system further comprising a shading device that is configured to cover the solar collector when activated in order to prevent solar energy from entering the solar collector and wherein the controller is programmed to activate the shading device in response to an overheating warning signal.

5. The vehicle battery charging system of claim 1, wherein the solar collector directs the concentrated solar energy to the solar panel via at least one fiber optic cable.

6. The vehicle battery charging system of claim 1, wherein the solar collector collects solar energy from a surface area that is larger than a surface area of the solar panel.

7. The vehicle system of claim 1, wherein the solar collector is located on a canopy of the parking structure.

8. A method comprising:
   collecting and concentrating solar energy with a solar collector located on a parking structure;
   directing the concentrated solar energy to a solar panel that is rigidly affixed to a vehicle parked within the parking structure to charge a battery; and
   in response to focus direction changes of the concentrated solar energy corresponding to seasonal Sun position differences, adjusting vehicle position such that the concentrated solar energy remains directed to the solar panel.

9. The method of claim 8, wherein the solar collector includes at least one Fresnel lens configured to concentrate and direct the solar energy to the solar panel located on the vehicle.

10. The method of claim 8, wherein a controller is programmed to adjust the position of the vehicle based upon time of day in order to compensate for movement of the Sun such that the concentrated solar energy remains directed to the solar panel.

11. The method of claim 8, wherein a controller is programmed to activate a shading device to cover the solar collector in order to prevent solar energy from entering the solar collector in response to an overheating warning signal.

12. The method of claim 8, wherein the solar collector directs the concentrated solar energy to the solar panel via at least one fiber optic cable.

13. The method of claim 8, wherein the solar collector collects solar energy from a surface area that is larger than a surface area of the solar panel.

14. The method of claim 8, wherein the solar collector is located on a canopy of the parking structure.

15. A vehicle configured to interact with a solar collector that includes a shading device, wherein the solar collector is configured to collect and concentrate solar energy and the shading device is configured to cover the solar collector when activated in order to prevent solar energy from entering the solar collector, comprising:
   a solar panel rigidly affixed to the vehicle, configured to receive concentrated solar energy, and charge a battery; and
   a controller programmed to,
      in response to a change in a direction of focus of the concentrated solar energy, adjust the position of the vehicle such that the concentrated solar energy remains directed to the solar panel, and
      in response to an overheating warning signal, activate the shading device.

16. The vehicle of claim 15, wherein the solar panel is mounted to a roof of the vehicle.

17. The vehicle of claim 15, wherein the solar panel has a smaller surface area than a surface area of the solar collector that is utilized to collect the solar energy.

* * * * *